United States Patent
Lewis (10) Patent No.: US 8,364,807 B1
(45) Date of Patent: Jan. 29, 2013

(54) IDENTIFYING AND CONTROLLING NETWORK SESSIONS VIA AN ACCESS CONCENTRATION POINT

(75) Inventor: Larry DeWayne Lewis, Plano, TX (US)

(73) Assignee: Rockstar Consortium US LP, Plano, TX (US)

( * ) Notice: Subject to any disclaimer, the term of this patent is extended or adjusted under 35 U.S.C. 154(b) by 2174 days.

(21) Appl. No.: 10/991,791

(22) Filed: Nov. 18, 2004

(51) Int. Cl.
G06F 15/173 (2006.01)

(52) U.S. Cl. ........ 709/224; 709/227; 709/223; 709/232; 709/249; 709/206

(58) Field of Classification Search .................. 709/224, 709/225, 230
See application file for complete search history.

(56) References Cited

U.S. PATENT DOCUMENTS

| | | |
|---|---|---|
| 6,349,337 B1 | 2/2002 | Parsons, Jr. et al. |
| 6,539,479 B1 | 3/2003 | Wu |
| 6,732,269 B1 | 5/2004 | Baskey et al. |
| 6,735,288 B1 | 5/2004 | Geen et al. |
| 6,937,597 B1 | 8/2005 | Rosenberg et al. |
| 6,971,017 B2 | 11/2005 | Stringer et al. |
| 7,020,084 B1 | 3/2006 | Tanaka et al. |
| 7,100,200 B2 | 8/2006 | Pope et al. |
| 7,225,226 B2 | 5/2007 | Fitzpatrick et al. |
| 7,249,377 B1 | 7/2007 | Lita et al. |
| 7,289,429 B2 | 10/2007 | Mo et al. |
| 7,296,205 B2 | 11/2007 | Curcio et al. |
| 7,299,047 B2 | 11/2007 | Dolan et al. |
| 7,778,194 B1 | 8/2010 | Yung |
| 2001/0021653 A1 | 9/2001 | Han |
| 2002/0065080 A1 | 5/2002 | Pittampalli et al. |
| 2002/0111158 A1 | 8/2002 | Tee |
| 2002/0126626 A1 | 9/2002 | Singh et al. |
| 2003/0081582 A1 | 5/2003 | Jain et al. |
| 2003/0088698 A1 | 5/2003 | Singh et al. |
| 2003/0200298 A1 | 10/2003 | Su et al. |
| 2004/0028026 A1 | 2/2004 | McClung et al. |
| 2004/0139209 A1 | 7/2004 | Mussman et al. |
| 2004/0165587 A1 | 8/2004 | Kiyoto |
| 2005/0091407 A1 | 4/2005 | Vaziri et al. |
| 2006/0072451 A1 | 4/2006 | Ross |
| 2006/0168304 A1* | 7/2006 | Bauer et al. ................... 709/232 |

(Continued)

OTHER PUBLICATIONS

Schulzrinne, H.; Rosenberg, J., "The Session Initiation Protocol: Internet-centric signaling," Communications Magazine, IEEE, vol. 38, No. 10, pp. 134-141, Oct. 2000.*

(Continued)

*Primary Examiner* — Phuoc Nguyen
*Assistant Examiner* — June Sison
(74) *Attorney, Agent, or Firm* — Withrow & Terranova, PLLC (57) ABSTRACT

The present invention facilitates identification and control of peer-to-peer sessions via an access concentration point (ACP). The ACP will monitor packets routed therethrough and detect access messages intended for known peer-to-peer access services. The access messages sent from a communication client to the peer-to-peer access service, which will respond by sending an access reply message back to the communication client. The ACP will monitor the packets being routed to identify the access reply message, which will include routing addresses that may be associated with potential remote communication clients. With these addresses, the ACP can monitor packets to identify when an attempt to initiate a peer-to-peer communication session is being made to or through an entity associated with one or more of these addresses. Upon detecting a session initiation message to or through an identified address, the ACP may take any number of actions, depending on how the ACP is configured.

18 Claims, 5 Drawing Sheets

U.S. PATENT DOCUMENTS

2006/0251000 A1* 11/2006 Williams .................. 370/315
2007/0214083 A1   9/2007 Jones et al.

OTHER PUBLICATIONS

Examiner's Answer to Appeal Brief for U.S. Appl. No. 11/053,044 mailed Feb. 1, 2011, 42 pages.
Final Office Action for U.S. Appl. No. 11/053,044 mailed Mar. 1, 2010, 35 pages.
Non-final Office Action for U.S. Appl. No. 11/053,044 mailed Aug. 5, 2009, 34 pages.
Advisory Action for U.S. Appl. No. 11/053,044 mailed Apr. 20, 2009, 3 pages.
Final Office Action for U.S. Appl. No. 11/053,044 mailed Jan. 8, 2009, 33 pages.
Non-final Office Action for U.S. Appl. No. 11/053,044 mailed May 28, 2008, 33 pages.
Office Action mailed May 14, 2012, issued by the Patent Office during prosecution of U.S. Appl. No. 13/370,641. 23 pages.
Final Office Action for U.S. Appl. No. 13/370,641 mailed Sep. 13, 2012, 24 pages.

* cited by examiner

IDENTIFYING AND CONTROLLING NETWORK SESSIONS VIA AN ACCESS CONCENTRATION POINT

FIELD OF THE INVENTION

The present invention relates to packet-based communications, and in particular to identifying and controlling communication sessions via an access concentration point.

BACKGROUND OF THE INVENTION

The evolution of packet communications has led to packet networks supporting various types of media services, including data, audio, video, and voice services. These services generally require vastly different resources to support acceptable levels of quality. Further, there is a movement to control the allocation of resources to subscribers based on service agreements defining different levels of service, as well as requirements of the requested services.

Since network resources, and in particular bandwidth, are limited, there is a need to keep track of those resources that have been allocated, control the allocation of resources, and prevent unauthorized use of resources. Unfortunately, certain types of communication sessions are difficult to control and can lead to excessive use, if not unknown use, of network resources. For example, peer-to-peer (P2P) sessions between communication clients are difficult to control, since network control entities cannot effectively detect peer-to-peer sessions or limit the resources used in supporting the peer-to-peer sessions. In many instances, where authorized resources represent most if not all of the available resources in a network, a peer-to-peer session may use sufficient resources to negatively impact the quality of the authorized sessions since the peer-to-peer session is causing the network capacity to be exceeded.

As such, there is a need for an efficient and effective technique to identify and control such communication sessions according to subscriber agreements or network policies.

SUMMARY OF THE INVENTION

The present invention facilitates identification and control of peer-to-peer sessions via an access concentration point. The access concentration point is an entity at the edge of a packet network at which numerous media flows for various communication clients are concentrated. In operation, the access concentration point will monitor packets routed therethrough and detect access messages intended for known peer-to-peer access services. These access messages may take any form, including login or registration messages. The access messages are generated from a communication client and sent to the peer-to-peer access service, which will respond to the access messages by sending an access reply message back to the appropriate communication client. The access concentration point will monitor the packets being routed to identify the access reply message, which will include routing addresses that may be associated with potential remote communication clients, internal routing nodes, or other entities, to which or through which peer-to-peer communication sessions may be established. Armed with these addresses, the access concentration point can further monitor packets to identify when an attempt to initiate a peer-to-peer communication session is being made to or through an entity associated with one or more of these addresses.

Upon detecting a session initiation message to or through an identified address, the access concentration point may take any number of actions, depending on how the access concentration point is configured. For example, these actions may include simply identifying and reporting the attempts to establish peer-to-peer communication sessions, dropping the session initiation messages to thwart establishment of peer-to-peer sessions, or rerouting the peer-to-peer communication sessions through a monitoring entity. Further, the access concentration point may be configured to actually monitor the content of peer-to-peer communication sessions that are allowed to be established. Accordingly, the access concentration points may be configured to provide efficient and effective identification and control of peer-to-peer communication sessions. As such, service providers can more efficiently control allocation and use of resources as dictated by subscriber and network policies.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
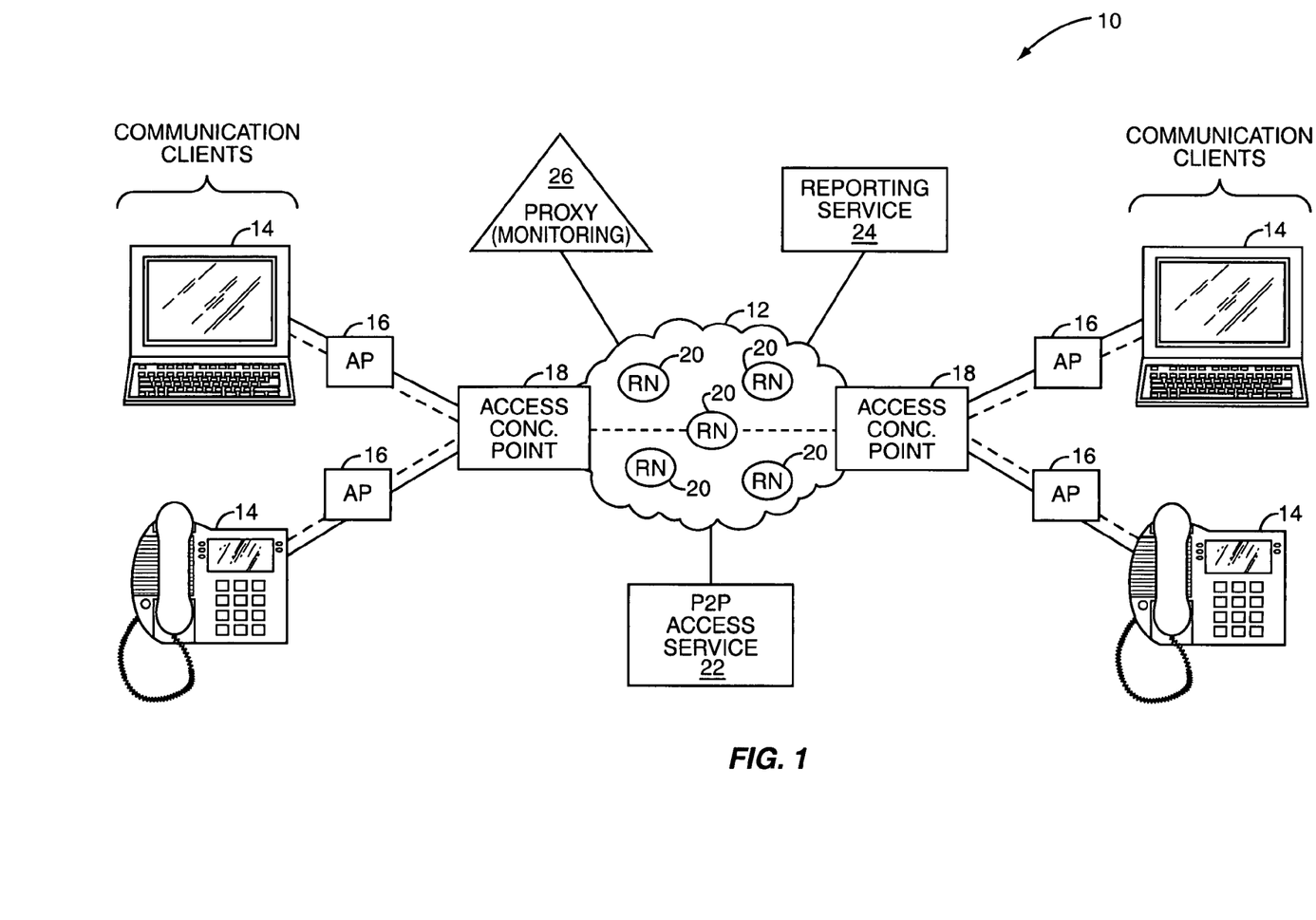
FIG. 1 is a block representation of a communication environment according to one embodiment of the present invention.

The present invention facilitates identification, and optional control, of peer-to-peer (P2P) sessions. With reference to FIG. 1, an exemplary communication environment 10 is illustrated in which identification of a peer-to-peer session is possible, given the present invention. In general, a packet network 12 is used to support packet-based communications between communication clients 14. These communication clients 14 may take many forms, such as personal computers (PCs), voice-over-packet telephony terminals, personal digital assistants (PDAs), or any other type of communication device. Access to the packet network 12 for the communication clients 14 may be afforded through an access point (AP) 16 and an access concentration point 18. The access points 16 may take any number of forms, including cable, digital subscriber line (DSL), dial-up, integrated services digital network (ISDN), or any other available modem that provides an interface between the corresponding communication client 14 and the packet network 12. Traditionally, the various access points 16 are connected to an access concentration point 18, which aggregates the communication flows with each of the access points 16 to properly interface with the packet network 12. As such, the various cable, DSL, dial-up, ISDN, or other type of communication flows are converted as necessary for delivery over the packet network 12, and vice versa. The access concentration point 18 may take many forms, but will generally reside at the edge of the packet network 12 and operate to aggregate connections with the access point 16.

As with most packet networks, the packet network 12 can support peer-to-peer communication sessions between the communication clients 14. These peer-to-peer sessions will be established through the respective access points 16 and access concentration points 18. Further, certain peer-to-peer sessions may use designated routing nodes 20 through which the peer-to-peer communication sessions are established.

Generally, communication clients 14 that establish peer-to-peer communication sessions will initially interact with a peer-to-peer access service 22 with which the communication clients 14 will register, and perhaps receive routing paths and associated addresses for the communication sessions. Accordingly, participating communication clients 14 will initially register with the peer-to-peer access service 22, and use information derived from the peer-to-peer access service 22 to establish peer-to-peer communication sessions with other communication clients 14 that are associated with the peer-to-peer access service 22. Further details on the establishment of peer-to-peer sessions will be provided with the following examples.

As noted, the present invention operates to identify peer-to-peer communication sessions. Identification is provided by the access concentration points 18. In operation, the access concentration points 18 will monitor packets from the communication clients 14 to identify access messages that are intended for the peer-to-peer access service 22. These access messages may take many forms, including those for logging in to the peer-to-peer access service 22 or for registering therewith. When the peer-to-peer access service 22 replies, the access concentration point 18 will capture the reply and analyze any associated routing information or addresses that may be associated with future peer-to-peer sessions involving the communication client 14. The reply may include addresses for communication clients 14 to which a peer-to-peer session may be established, as well as internal routing addresses such as those associated with the routing nodes 20. When the communication client 14 attempts to establish a peer-to-peer session with one of the communication clients 14 associated with one of these addresses, the access concentration point 18 can recognize the attempt to establish the peer-to-peer communication session and take any number of desired actions. These actions may include simply logging and reporting the fact that a peer-to-peer session was attempted, the peer-to-peer session may be thwarted by dropping the request to establish the session, the content of the peer-to-peer session may be intercepted at the access concentration point 18, or the peer-to-peer session may be established through a monitoring entity. As illustrated in FIG. 1, a reporting service 24 may be provided to which reporting messages are sent in association with detecting or controlling peer-to-peer communication sessions. Further, a proxy 26 is provided such that the peer-to-peer session can be established through the proxy 26 for monitoring.

Figure 2A:
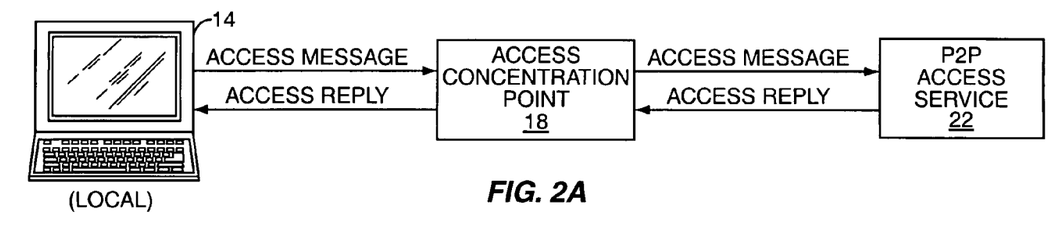
FIGS. 2A-2D illustrate different scenarios in which communication sessions may be identified and controlled according to select embodiments of the present invention.

In operation, the present invention will employ an inspection function in the access concentration point 18 to monitor packets being routed through the packet network 12. With reference to FIG. 2A, a technique for obtaining information relevant to peer-to-peer communication services is illustrated. In general, the access concentration points 18 will monitor packets to detect messages that are sent to or received from the peer-to-peer access service 22. These messages may be generally characterized to include access messages sent to and access reply messages received from the peer-to-peer access service 22. The access messages may be any type of message intended for the peer-to-peer access service 22, including login, registration, or other information query messages. Many of these messages will elicit a reply, which is generally referred to as an access reply message. The access concentration point 18 will store addresses associated with peer-to-peer access services 22 and recognize messages sent to these addresses and received from these addresses. Further, the access concentration point 18 will keep track of those communication clients 14 that communicate with the peer-to-peer access services 22.

As illustrated, when a local communication client 14 sends an access message toward a peer-to-peer access service 22, the access concentration point 18 will detect the message and allow the message to continue on to the peer-to-peer access service 22. When the peer-to-peer access service 22 generates an access reply message to the access message, the access reply message will traverse the access concentration point 18, which will analyze information in the access reply message and forward the access reply message on to the local communication client 14. The information analyzed in the access reply message may include the addresses for communication clients 14 with which peer-to-peer sessions may be established, as well as addresses for defined routing entities, such as the routing nodes 20 through which a peer-to-peer session may be directed by the peer-to-peer access service 22. The access message may also be analyzed to derive the addresses or other information relative to peer-to-peer communication sessions. The databases associated with tracking and controlling the peer-to-peer communication sessions may be updated in a continuous fashion based on analysis of the various access and access reply messages. By analyzing the correspondence between the local communication client 14 and the peer-to-peer access service 22, the access concentration point 18 will have sufficient information to detect an attempt to initiate a peer-to-peer session with a remote communication client 14.

Accordingly, the access concentration points 18 also monitor the packets from all communication clients 14 or select communication clients 14 that have been identified as those participating in peer-to-peer communication sessions or interacting with the peer-to-peer access service 22, to detect messages intended to establish peer-to-peer communication sessions. These messages are generally referred to as session initiation messages (SIMs), and may be detected as being any type of message involved in establishing a communication session from a communication client 14 to which or from which participation in peer-to-peer communication sessions is known or suspected, based on current or past information. Accordingly, the access concentration point 18 may detect a session initiation message from a local communication client 14 that is known to participate in peer-to-peer communication sessions; detect a session initiation message to a remote communication client 14 that is known to participate in peer-to-peer communication sessions; or detect information in the session initiation message indicating that a peer-to-peer communication session is being established through any means.

Once a session initiation message is detected, any number of actions may be taken alone or in combination. In a more basic embodiment, the session initiation messages associated with P2P communications are simply dropped, such that the intended communication session is prevented. In another embodiment, the identification of a session initiation message associated with P2P communications may dictate sending a notification to a reporting service 24 to record information pertaining to the attempt to establish a P2P communication session from the local communication client 14 to the remote communication client 14. When such session initiation messages are reported, the packet carrying the session initiation message may be dropped to prevent establishment of the P2P communication session, or the session initiation message may be forwarded in traditional fashion to allow the P2P communication session to be established. In yet another embodiment, the inspection function may take the necessary steps to have the P2P communication session routed through a monitoring function, which may be provided by a proxy 26. As such, the communication session may be established through the proxy 26, such that the content of the P2P communication session may be monitored with or without the knowledge of the local and remote communication clients 14 participating in the communication session.

Figure 2B:
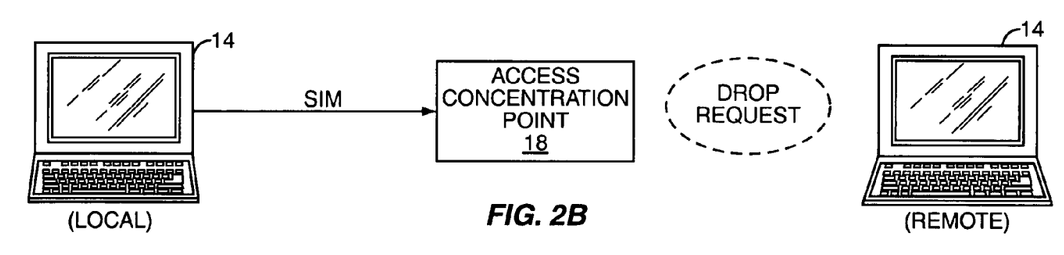
Figure 2C:
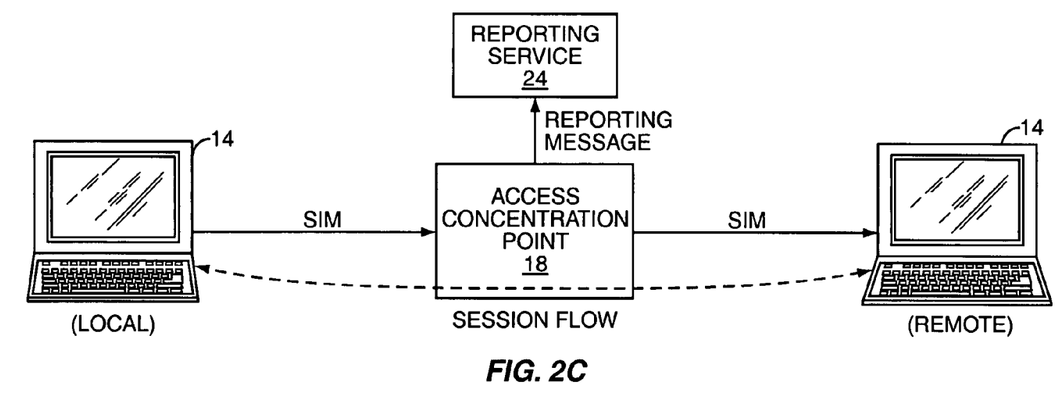
Figure 2D:
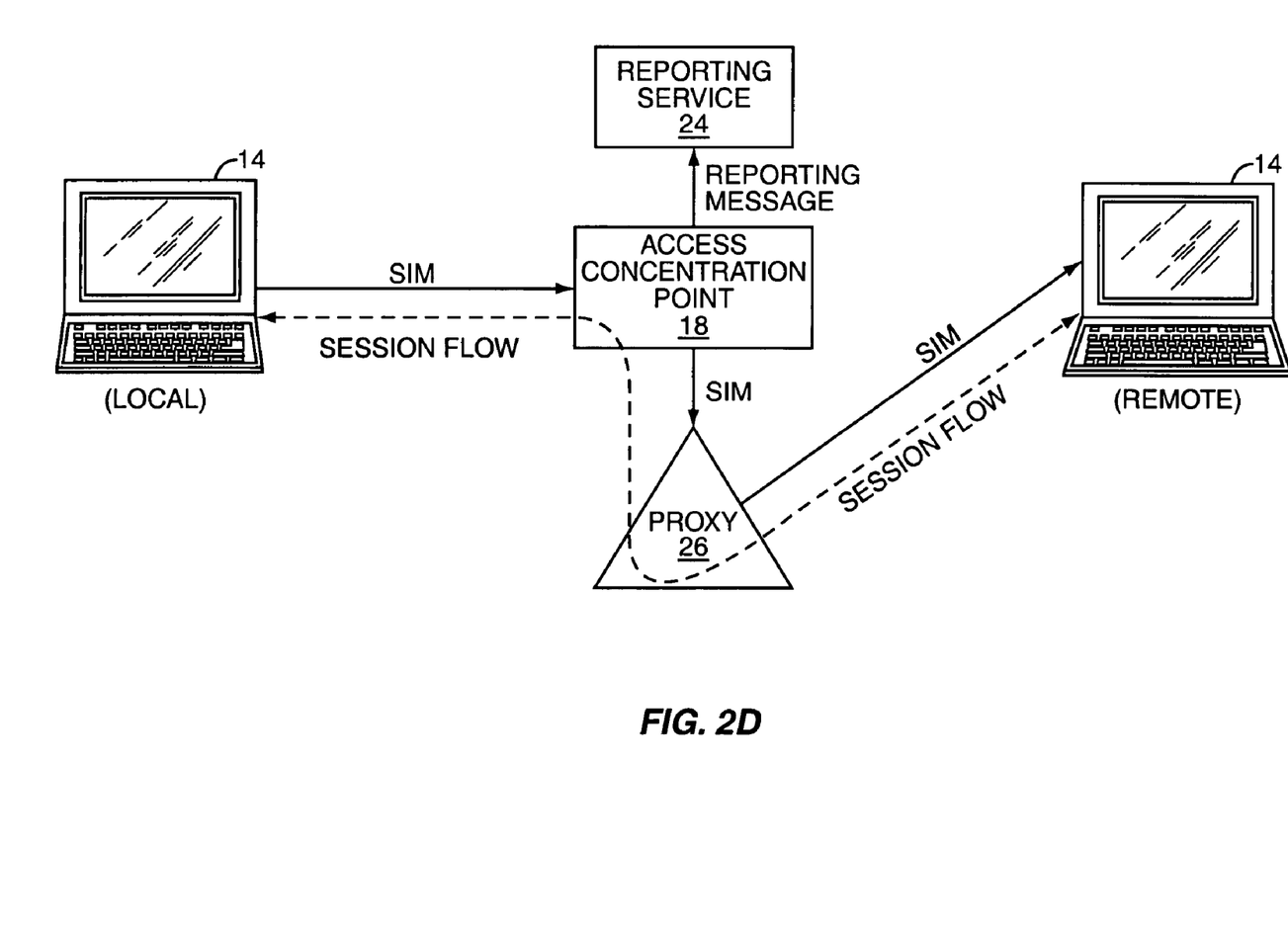

FIGS. 2B-2D provide functional illustrations of how packets are inspected to identify session initiation messages associated with P2P communication sessions and the resulting processing once a SIM is identified. With reference to FIG. 2B, the access concentration point 18 is used to inspect all packets routed therethrough. A local communication client 14 initiates a P2P communication session by sending a SIM, such as a Session Initiation Protocol (SIP) Invite message, toward a remote communication client 14. Assuming the SIM is embodied in a packet routed through the access concentration point 18, the access concentration point 18 will identify the packet as being one representing a SIM associated with a P2P communication session. In this embodiment, the access concentration point 18 will simply drop the packet representing the SIM to prevent establishment of the desired P2P communication session between local and remote communication clients.

Turning now to FIG. 2C, when the access concentration point 18 identifies a packet representing a SIM associated with P2P communication session, a reporting message is sent to the reporting service 24 to provide the details associated with the SIM, and the SIM is forwarded toward remote communication client 14 such that the P2P communication session may be established and a session flow may take place between the local and remote communication clients 14. Accordingly, the access concentration point 18 may monitor each of the packets within the session flow, as well as the session control messages used to establish the P2P communication session. Those skilled in the art will recognize that additional control messages will be used to establish the P2P communication sessions in traditional fashion. Certain or all of these control messages may represent a session initiation message.

With reference to FIG. 2D, the access concentration point 18 is configured to identify a SIM associated with a P2P communication session, send a corresponding reporting message to the reporting service 24, and redirect the requested P2P communication session to be established through a proxy 26, which will act as a monitoring device for the session initiation messages, session traffic, or a combination thereof. As such, the SIM may be forwarded to the proxy 26, which will forward the SIM to the remote communication client 14, wherein a communication session is established through the proxy 26 and the access concentration point 18, such that the traffic creating the session flow in the communication session may be monitored. Those skilled in the art will recognize that the monitoring of the session traffic may take place at the proxy 26, access concentration point 18, or other monitoring entity through which the communication session is established. The proxy 26 may also act as a proxy in a traditional sense for handling session control messages. As such, the session control messages may be handled by the proxy 26, which will operate to establish the session between the local and remote communication clients 14 through an appropriate monitoring entity, which may be provided by the access concentration point 18.

In another embodiment, the criteria used to identify P2P access services 22 and participating communication clients 14 may be updated periodically as the criteria change, new P2P access services 22 and participating communication clients 14 are discovered, or old ones should be removed from being considered involved in P2P communication sessions. The updating process would be analogous to updates provided on a systematic basis for antivirus applications.

Figure 3:
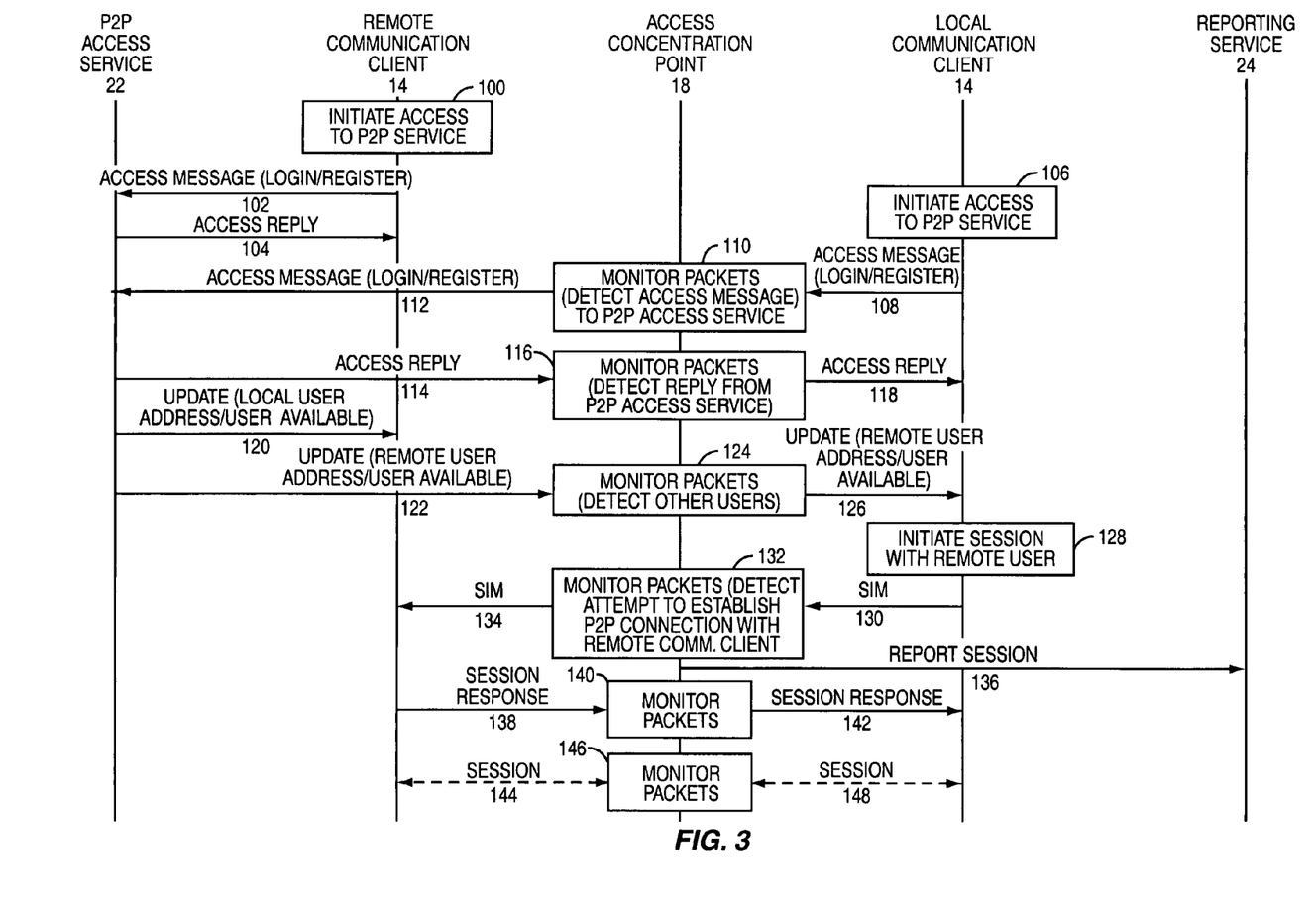
FIG. 3 is a communication flow diagram illustrating the process for identifying and controlling a communication session according to one embodiment of the present invention.

Turning now to FIG. 3, a more detailed communication flow is provided to illustrate exemplary operation of the present invention according to one embodiment. Initially, assume a remote communication client 14 associated with User B, desires to establish P2P communication sessions and wants to associate with the P2P access service 22 to facilitate such communication sessions. Initially, User B will interact with the remote communication client 14 to initiate access to the P2P access service 22 (step 100). An access message is sent to the P2P access service 22 to log into or otherwise register with the P2P access service 22, which keeps an updated list of active or available users (step 102). The P2P access service 22 will allow User B to log in or otherwise register, and will send an access reply message back to remote communication client 14 indicating that the login or registration process is complete (step 104). The access reply message may include addresses of various communication clients to which P2P communication sessions may be established, routing nodes 20, or other entities associated with supporting the P2P communication sessions.

Subsequently, a local communication client 14 will initiate interaction with the P2P access service 22 in response to instructions from User A (step 106). As such, the local communication client 14 will send an access message for login or registration purposes toward the P2P access service 22 (step 108). The access message is routed through the local communication client's access concentration point 18, wherein the associated packet or packets are monitored (step 110) and routed toward the P2P access service 22 (step 112). The P2P access service 22 will log in or otherwise register User A and the associated local communication client 14 and send an access reply message back toward remote communication client 14 (step 114). The access reply message is detected and monitored by the access concentration point 18 (step 116) and routed to the local communication client 14 (step 118). The access concentration point 18 may obtain addresses of various communication clients to which P2P communication sessions may be established, routing nodes 20, or other entities associated with supporting the P2P communication sessions.

At this point, the P2P access service 22 may operate in a fashion similar to a text messaging service by providing information alerting the active users of other active users when a new person becomes active or an active person becomes inactive. As such, the P2P access service 22 may send an update to the remote communication client 14 indicating that User A is available, and may also provide User A's address, which may be the IP address for the local communication client 14 (step 120). Similarly, the P2P access service 22 may send an update toward the local communication client 14 (step 122), wherein the update is monitored by the access concentration point 18 (step 124) and forwarded to the local communication client 14 (step 126). Notably, this address information may have already been known by the P2P access service 22 and detected by the access concentration point 18 on the access reply message sent to the remote communication client 14. At this point, User A is alerted that User B is active and available for communications, and User B is alerted that User A is active and available for communications. The respective local and remote communication clients 14 know each other's addresses.

Next, assume User A causes the local communication client 14 to initiate a P2P communication session with the remote communication client 14 of User B (step 128). As such, the local communication client 14 will send a SIM toward the remote communication client 14 (step 130). The SIM is represented by a packet routed through the access concentration point 18, which will monitor all of the packets routed therethrough and will detect the SIM from the local communication client 14 as being one associated with a P2P communication session, by analyzing the intended address (of the remote communication client 14) or other information indicative of a P2P communication session (step 132). The access concentration point 18 may forward the SIM to the remote communication client 14 (step 134), as well as send a reporting message to the reporting service 24 (step 136). The reporting message may identify the originating (local) and terminating (remote) communication clients 14, respectively, and any other information deemed appropriate for analyzing and reporting.

The remote communication client 14 will respond to the SIM by sending a session response toward local communication client 14 (step 138). The session response will pass through the access concentration point 18 where it is monitored (step 140), and is then forwarded to the local communication client 14 (step 142). At this point, a session is established between the local communication client 14 and the remote communication client 14 through the access concentration point 18, wherein the packets representing the information being transferred between local and remote communication clients 14 for the communication session are monitored (steps 144, 146, and 148). Notably, the SIM will generally include the address of the originating local communication client 14 and any port and coding information for the communication session. Similarly, the session response may include the address of the terminating remote communication client 14 and any relevant port and coding information. As such, each of the local and remote communication clients 14 will have the necessary information to determine where and how to send packets to facilitate the P2P communication session. Those skilled in the art will recognize that the P2P communication session may be forced to be routed through select routing nodes 20. As such, the access concentration point 18 may be triggered by the address of the known nodes 20 for detecting and controlling P2P communication sessions. As noted, the address of these routing nodes 20 may be obtained from the communications between the communication clients 14 and the P2P access service 22 or communications with other communication clients.

Figure 4:
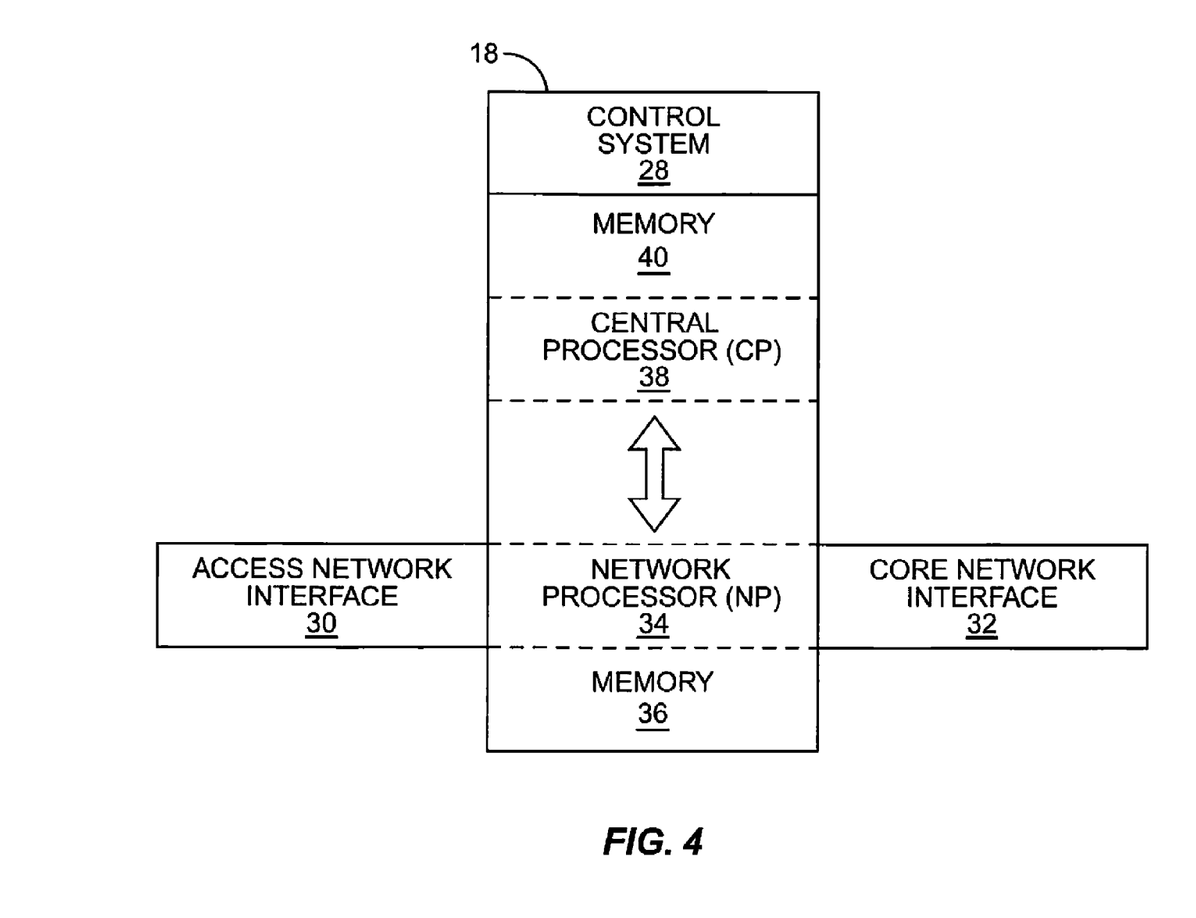
FIG. 4 is a block representation of an access concentration point according to one embodiment of the present invention.

Turning now to FIG. 4, a block representation of an access concentration point 18 is illustrated according to one embodiment of the present invention. The access concentration point 18 will include a control system 28 associated with an access network interface 30 and a core network interface 32. The access network interface 30 is the interface to which the various communication clients 14 are connected, directly or indirectly through corresponding access points 16. The core network interface 32 provides an interface to the packet network 12. In the illustrated embodiment, the control system 28 includes a network processor (NP) 34 associated with memory 36 and a central processor (CP) 38 associated with memory 40. The network processor 34 will provide the various packet processing functions, which include packet monitoring and message and information detection as described above. The central processor 38 will cooperate with the network processor 34 to provide the overall control of the access concentration point 18. Such control may include how to respond to the detection of interaction with the peer-to-peer access service 22 or an attempt to establish a peer-to-peer communication session. Those skilled in the art will recognize the general operation of the central processor 38 in relation to the network processor 34.

Those skilled in the art will recognize improvements and modifications to the preferred embodiments of the present invention. All such improvements and modifications are considered within the scope of the concepts disclosed herein and the claims that follow.

What is claimed is:

1. A method comprising:
providing at least one access network interface;
providing at least one packet network interface;
monitoring packets being routed between the at least one access network interface and the at least one packet network interface;
identifying select ones of the packets representing access messages intended for a peer-to-peer access service; and
identifying select ones of the packets from the peer-to-peer access service representing access reply messages in response to the access messages.

2. The method of claim 1 further comprising:
identifying select ones of the packets representing session initiation messages for peer-to-peer communication sessions; and
processing the select ones of the packets representing session initiation messages according to defined criteria.

3. The method of claim 2 further comprising:
identifying addresses provided in the access reply messages; and
identifying the select ones of the packets representing session initiation messages for peer-to-peer communication sessions when the session initiation messages include the addresses.

4. The method of claim 3 wherein the addresses are used for routing packets associated with the peer-to-peer communication sessions.

5. The method of claim 4 wherein the addresses are associated with remote communication clients.

6. The method of claim 4 wherein the addresses are associated with routing nodes in a packet network.

7. The method of claim 2 wherein the defined criteria dictate that the select ones of the packets representing session initiation messages are dropped, and further comprising dropping the select ones of the packets representing session initiation messages.

8. The method of claim 2 wherein the defined criteria dictate that the select ones of the packets representing session initiation messages are routed toward their destination, and further comprising routing the select ones of the packets representing session initiation messages.

9. The method of claim 8 further comprising sending reporting messages to a reporting service when the select ones of the packets representing session initiation messages are identified.

10. The method of claim 2 further comprising sending reporting messages to a reporting service when the select ones of the packets representing session initiation messages are identified.

11. The method of claim 2 wherein the defined criteria dictate that the select ones of the packets representing session initiation messages are routed to a proxy for further processing, and further comprising routing the select ones of the packets representing session initiation messages to the proxy.

12. The method of claim 2 further comprising monitoring traffic in the peer-to-peer communication sessions associated with the session initiation messages.

13. The method of claim 2 wherein the session initiation messages are intended to initiate the peer-to-peer communication sessions between at least two communication clients over a packet network through which the packets are routed.

14. The method of claim 2 wherein the session initiation messages are session initiation protocol messages.

15. The method of claim 14 wherein the session initiation protocol messages are invite messages.

16. The method of claim 2 further comprising periodically receiving information and updating the defined criteria based on the information.

17. The method of claim 2 wherein the session initiation messages are configured to initiate the peer-to-peer communication sessions for voice communications.

18. The method of claim 2 wherein the session initiation messages are configured to initiate the peer-to-peer communication sessions for at least one of the group consisting of audio, video, and data communications.

* * * * *